(12) United States Patent
Andreozzi

(10) Patent No.: US 10,853,138 B2
(45) Date of Patent: Dec. 1, 2020

(54) SCHEDULING RESOURCE USAGE

(71) Applicant: Arm Limited, Cambridge (GB)

(72) Inventor: Matteo Maria Andreozzi, Cambridge (GB)

(73) Assignee: Arm Limited, Cambridge (GB)

( * ) Notice: Subject to any disclaimer, the term of this patent is extended or adjusted under 35 U.S.C. 154(b) by 165 days.

(21) Appl. No.: 16/120,659

(22) Filed: Sep. 4, 2018

(65) Prior Publication Data

US 2020/0073715 A1 Mar. 5, 2020

(51) Int. Cl.
  *G06F 9/46* (2006.01)
  *G06F 9/50* (2006.01)
  *G06F 9/48* (2006.01)

(52) U.S. Cl.
  CPC .......... *G06F 9/5011* (2013.01); *G06F 9/4818* (2013.01)

(58) Field of Classification Search
  None
  See application file for complete search history.

(56) References Cited

PUBLICATIONS

Lenzini et al., "Tradeoffs Between Low Complexity, Low Latency, and Fairness with Deficit Round-Robin Schedulers", *IEEE/ACM Transactions of Networking*, vol. 12, No. 4, Aug. 2004, pp. 681-693.
Lenzini et al., "Full Exploitation of the Deficit Round Robin Capabilities by Efficient Implementation and Parameter Tuning", *Technical Report*, Oct. 2003, 18 pages.
Shreedhar et al., "Efficient Fair Queuing using Deficit Round Robin", *Washington University*, Nov. 18, 1994, 27 pages.

*Primary Examiner* — Gregory A Kessler
(74) *Attorney, Agent, or Firm* — Nixon & Vanderhye P.C.

(57) ABSTRACT

Methods of scheduling usage of a resource between multiple resource users and corresponding schedulers are disclosed. The scheduling is performed by initially allocating a per-round usage allowance to each resource user of the multiple resource users and then determining a usage schedule for the resource in a sequence of rounds. At each round the determining comprises, for each resource user, when there are unscheduled usage requests for the resource user, scheduling a portion of the unscheduled usage requests which does not exceed the per-round usage allowance for the resource user, wherein the portion is scheduled for resource usage in association with the current round. Further, at each round, when there exists a remainder of the unscheduled usage requests which exceeds the per-round usage allowance for the resource user, the remainder is scheduled in association with a later round, wherein a number of rounds offset from the current round to the later round is calculated in dependence on a specified maximum request latency for the resource user. Minimum bandwidth and maximum latency requirements for each user are thus supported.

18 Claims, 5 Drawing Sheets

SCHEDULING RESOURCE USAGE

TECHNICAL FIELD

The present disclosure relates to scheduling of a shared resource.

DESCRIPTION

When a resource in a system is used by multiple resource users a scheduler may be provided to allocate access to the resource according to a defined scheme. For example usage of the resource may be allocated on a "round robin" basis according to which units of access to the resource (e.g. time slices or bandwidth) are assigned to each user in equal portions and in a circular order, applying to all users without priority. Variants on a round robin scheduling scheme have been proposed, such as the "deficit round robin" scheme proposed by M. Shreedhar and George Varghese in "Efficient fair queuing using deficit round robin", published in Proceedings of the Conference on Applications, Technologies, Architectures, and Protocols for Computer Communication (SIGCOMM '95), ACM, New York, N.Y., USA, 231-242. DOI=http://dx.doi.org/10.1145/217382.217453.

SUMMARY

In one example embodiment described herein there is a method of scheduling usage of a resource between multiple resource users comprising: allocating a per-round usage allowance to each resource user of the multiple resource users; and determining a usage schedule for the resource in a sequence of rounds, wherein in a current round the determining comprises, for each resource user: when there are unscheduled usage requests for the resource user, scheduling a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, scheduling the remainder in association with a later round, wherein a number of rounds offset from the current round to the later round is calculated in dependence on a specified maximum request latency for the resource user.

In one example embodiment described herein there is a scheduler for scheduling usage of a resource between multiple resource users comprising: allocation circuitry to allocate a per-round usage allowance to each resource user of the multiple resource users; and usage schedule determination circuitry to determine a usage schedule for the resource in a sequence of rounds, wherein the usage schedule determination circuitry is arranged, in a current round and for each resource user, to: when there are unscheduled usage requests for the resource user, schedule a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

In one example embodiment described herein there is a scheduler for scheduling usage of a resource between multiple resource users comprising: means for allocating a per-round usage allowance to each resource user of the multiple resource users; and means for determining a usage schedule for the resource in a sequence of rounds, wherein the means for determining is arranged, in a current round and for each resource user, to: when there are unscheduled usage requests for the resource user, schedule a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
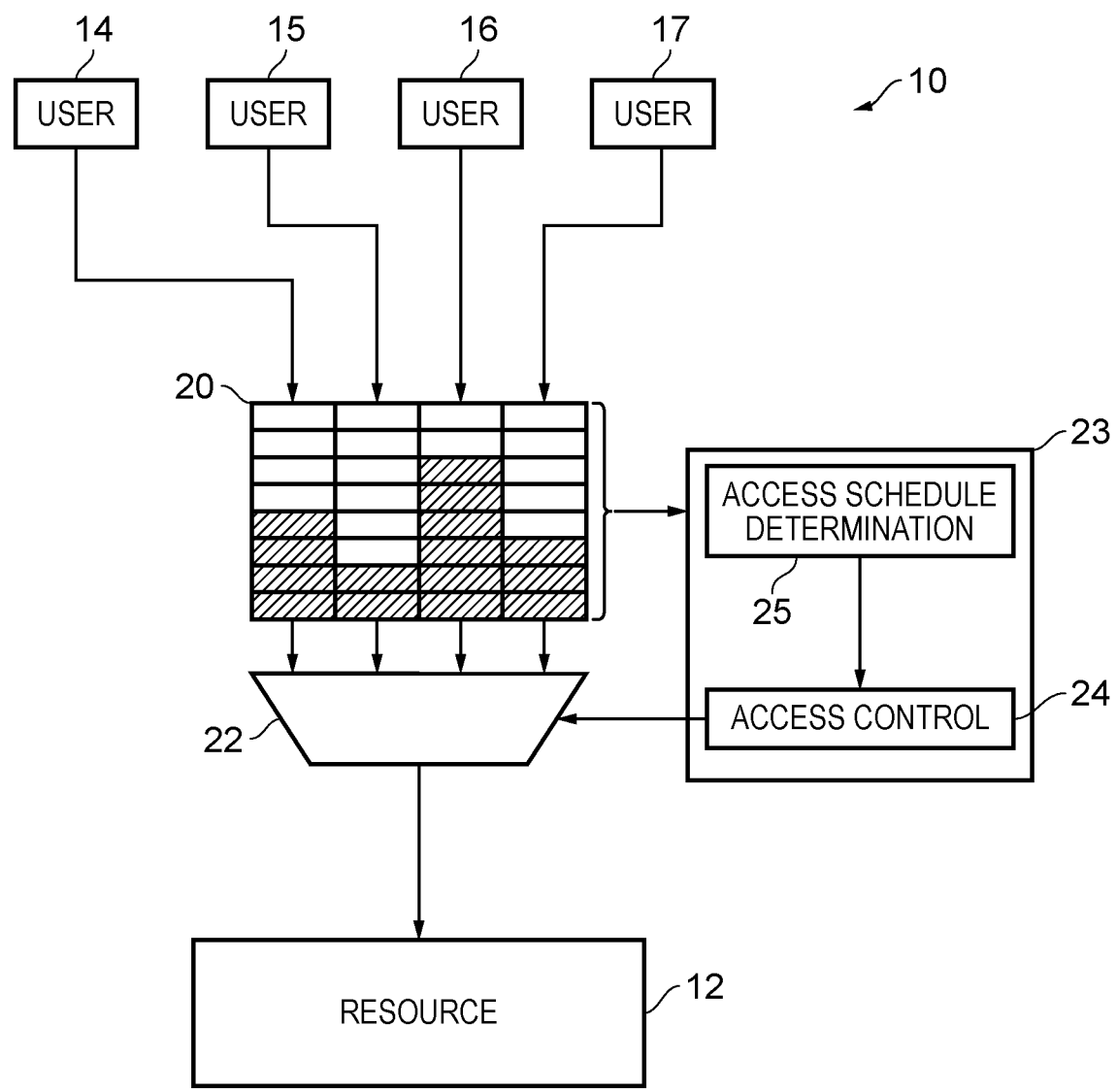
FIG. 1 schematically illustrates a system comprising multiple resource users and a shared resource, access to which is controlled by a scheduler according to one example embodiment.

Before discussing the embodiments with reference to the accompanying figures, the following description of embodiments is provided.

In accordance with one example configuration there is provided a method of scheduling usage of a resource between multiple resource users comprising: allocating a per-round usage allowance to each resource user of the multiple resource users; and determining a usage schedule for the resource in a sequence of rounds, wherein in a current round the determining comprises, for each resource user: when there are unscheduled usage requests for the resource user, scheduling a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, scheduling the remainder in association with a later round, wherein a number of rounds offset from the current round to the later round is calculated in dependence on a specified maximum request latency for the resource user.

The schedule determined for the usage of the resource between the multiple resource users thus takes into account two criteria with respect to each resource user: a per-round usage allowance (also referred to herein as a "quantum") and a maximum request latency. At each round therefore for each resource user may be allocated up to its per-round usage allowance. Further, when a resource user has more than its per-round usage allowance pending as unscheduled usage requests, the remainder of the unscheduled usage requests which exceeds the per-round usage allowance is not merely postponed but rather scheduled for a later round, where the approach taken by the present techniques is to determine a number of rounds offset from the current round to the later round in which that remainder is scheduled in dependence on a specified maximum request latency for the resource user. Thus not only does the scheduling ensure that each resource user, at each round, has access to the resource for its per-round user allowance, but also that "excess" requests (which exceed the per-round usage allowance) are ensured to be scheduled in such a way that the specified maximum request latency for the resource user is respected and therefore that all usage requests for a given resource user then satisfy both the resource user requirements. In turn this supports a useful quality-of-service approach to resource usage allocation, in particular in cases where at least some resource users cannot tolerate excess latency delay in their usage requests being serviced.

The number of rounds offset may be variously calculated, but in some embodiments the number of rounds offset is calculated as the specified maximum request latency for the resource user multiplied by a per-round throughput.

The per-round throughput may be variously defined, but in some embodiments the per-round throughput is a total bandwidth for the resource divided by a sum of the per-round usage allowances for the multiple resource users. Thus for example where the specified maximum request latency for a resource user may be defined as a maximum time period, and where the for total bandwidth of the resource may be defined as a quantity (e.g. data size) per unit time, and the per-round usage allowances are defined in terms of the aforementioned quantity (e.g. data size), then the per-round throughput is defined in terms of "per unit time" and thus when multiplied by the specified maximum request latency (in time units), the number of rounds offset becomes a dimensionless quantity specifying how many rounds there are between the current round and the later round in which the remainder of the unscheduled usage requests for a resource user will be scheduled.

The per-round usage allowance for each resource user may be variously calculated, but in some embodiments for each resource user of the multiple resource users the per-round usage allowance is calculated as a bandwidth share for the resource user multiplied by a sum of the per-round usage allowances for the multiple resource users.

The bandwidth share for each resource user may be variously defined, but in some embodiments the bandwidth share for the resource user is calculated as a specified minimum bandwidth for the resource user divided by a total bandwidth for the resource.

The scheduling of usage requests in association with rounds may be implemented in various ways. In some embodiments a priority system is used, wherein a usage request is scheduled by associating a priority with that request, where there is a link between priorities and rounds. For example, in some embodiments scheduling the portion for resource usage in association with the current round comprises associating with the portion a priority associated with the current round. Similarly, in some embodiments scheduling the remainder in association with the later round comprises associating with the remainder a priority associated with the later round.

These priorities may be determined in a variety of ways, but in some embodiments the priority associated with the later round is calculated as a priority associated with the current round less a predetermined priority distance for the resource user, wherein the priority distance is selected to represent the specified maximum request latency for the resource user. Accordingly, in order to implement the specified maximum request latency for a resource user this may be expressed in terms of a priority distance, i.e. effectively a number of rounds, such that the delay that is then applied to the remainder of the unscheduled usage requests is implemented as a "priority distance" corresponding to a number of rounds.

The present techniques further propose that prior to carrying out the above described method of scheduling usage of a resource (in any of the above described variants), a pre-scheduling configuration procedure can be carried out in order to determine appropriate per-round usage allowances for each resource user and specified maximum request latencies for each resource user. Hence, in some embodiments the method further comprises a pre-scheduling configuration procedure comprising: setting a candidate maximum request latency for each resource user; setting a candidate minimum bandwidth for each resource user; determining a candidate number of rounds offset from the current round to the later round in dependence on the candidate maximum request latency for each resource user; and determining a candidate per-round usage allowance for each resource user in dependence on the candidate minimum bandwidth for each resource user. Candidate maximum request latencies and candidate minimum bandwidths are thus defined for each resource user and on the basis of these values candidate number of rounds offsets and candidate per-round usage allowances are determined for each resource user.

Further, it is proposed that it can then be evaluated if the thus-calculated candidate number of rounds offset valuation procedure to determine if the calculated candidate number of rounds offset and candidate per round usage allowance for each resource user can be implemented according to any appropriate criteria. Accordingly in some embodiments the method further comprises an evaluation procedure comprising: determining whether the candidate number of rounds offset for each resource user satisfies at least one number of rounds selection criterion; determining whether the candidate per-round usage allowance for each resource user satisfies at least one usage allowance selection criterion; and when at least one of the number of rounds selection criterion and the usage allowance selection criterion is not satisfied, causing the pre-scheduling configuration procedure to be reiterated with at least one of: a modified candidate maximum request latency for each resource user; and a modified candidate minimum bandwidth for each resource user, with respect to prior iterations of the pre-scheduling configuration procedure. The number of rounds selection criterion and the usage allowance selection criterion may be variously defined according to the requirements of the system being implemented, but may for example be specified by the resource usage requirements of the respective resource users, i.e. to ensure that each resource user gains sufficient access to the resource to meet its own performance requirements. An iterative configuration and evaluation procedure can thus be carried out to determine maximum request latencies and minimum bandwidth for each resource user which meet these requirements. Nonetheless it should also be recognised that it is possible for the set up of this procedure to be such that the evaluation procedure cannot find an acceptable conclusion to this process, for example where the specified requirements for each of the resource user are not mutually compatible. The evaluation procedure may therefore comprise further feedback to the user seeking to implement this configuration and evaluation procedure to indicate that the specified criteria for each resource user have been found to be mutually incompatible, i.e. the requested resource usage for the multiple resource users cannot be satisfied.

The pre-scheduling configuration procedure may further comprise, for each resource user, computing a candidate sum of the per-round usage allowances for the multiple resource users as a product of the candidate maximum request latency for the resource user and the total bandwidth for the resource; and determining a lowest common multiple of the candidate sums computed. Thus the present techniques propose that as part of the configuration procedure, as each resource user is considered in turn, that candidate sums of the per-round usage allowances for the multiple resource users are calculated and that then subsequently a lowest common multiple of the candidate sums is determined. This approach enables a final value for the sum of the per-round usage (allowances to be used in a subsequent determination of the candidate number of rounds offset and the candidate per round usage allowance for each resource user) to be identified which represents, for this iteration of the evaluation procedure, the most efficient manner in which the candidate per-round usage allowances currently being considered for each resource user might be implemented.

Then, on the basis of this approach, the method may comprise, for each resource user, determining the candidate number of rounds offset as a product of the candidate maximum request latency for the resource user and the total bandwidth for the resource, divided by the lowest common multiple of the candidate sums computed.

Similarly on the basis of this approach, the method may further comprise, for each resource user, determining the candidate per-round usage allowance as a product of the candidate minimum bandwidth for the resource user and the lowest common multiple of the candidate sums computed, divided by the total bandwidth for the resource. Hence, where the candidate number of rounds offset determined in this manner for each resource user results in a set satisfies the at least one number of rounds selection criterion, then this iteration may be possible to implement.

In the method which includes the pre-scheduling configuration procedure, prior to a first iteration of the prescheduling configuration procedure, the candidate number of rounds offset for each resource user may be set to 1.

The resource schedule thus may be implemented in a variety of ways but in some embodiments the method further comprises transmitting the usage schedule for the resource to a resource controller arranged to implement the usage schedule for the resource.

In some embodiments the method further comprises controlling usage of the resource between the multiple resource users by implementing the usage schedule.

In accordance with one example configuration there is provided a scheduler for scheduling usage of a resource between multiple resource users comprising: allocation circuitry to allocate a per-round usage allowance to each resource user of the multiple resource users; and usage schedule determination circuitry to determine a usage schedule for the resource in a sequence of rounds, wherein the usage schedule determination circuitry is arranged, in a current round and for each resource user, to: when there are unscheduled usage requests for the resource user, schedule a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

In accordance with one example embodiment there is provided a scheduler for scheduling usage of a resource between multiple resource users comprising: means for allocating a per-round usage allowance to each resource user of the multiple resource users; and means for determining a usage schedule for the resource in a sequence of rounds, wherein the means for determining is arranged, in a current round and for each resource user, to: when there are unscheduled usage requests for the resource user, schedule a portion of the unscheduled usage requests which does not exceed the per-round usage allowance for the resource user, wherein the portion is scheduled for resource usage in association with the current round; and when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

Particular embodiments will now be described with reference to the figures.

FIG. 1 schematically illustrates a system 10 comprising a resource 12, access to which is shared by multiple resource users 14, 15, 16, 17. In seeking to make use of the shared resource 12 the resource users issue usage requests which are received by a multi-channel buffer 20. Usage requests queued in the buffer 20 are selectively allowed to make use of the resource 20 by means of the multiplexer 22 which operates under the control of access control 24 to determine which usage requests are allowed access to the resource 12 in what order. The access control 24 forms part of a resource scheduler 23, which also comprises access schedule determination unit 25. The access schedule determination unit 25 monitors the content of the multi-channel buffer 20 and determines an access schedule according to which these usage requests will be allowed to make use of the shared resource 12. The scheduling determined by the access schedule determination unit 25 is passed to the access control 24 for implementation in controlling the multiplexer 22.

Figure 2:
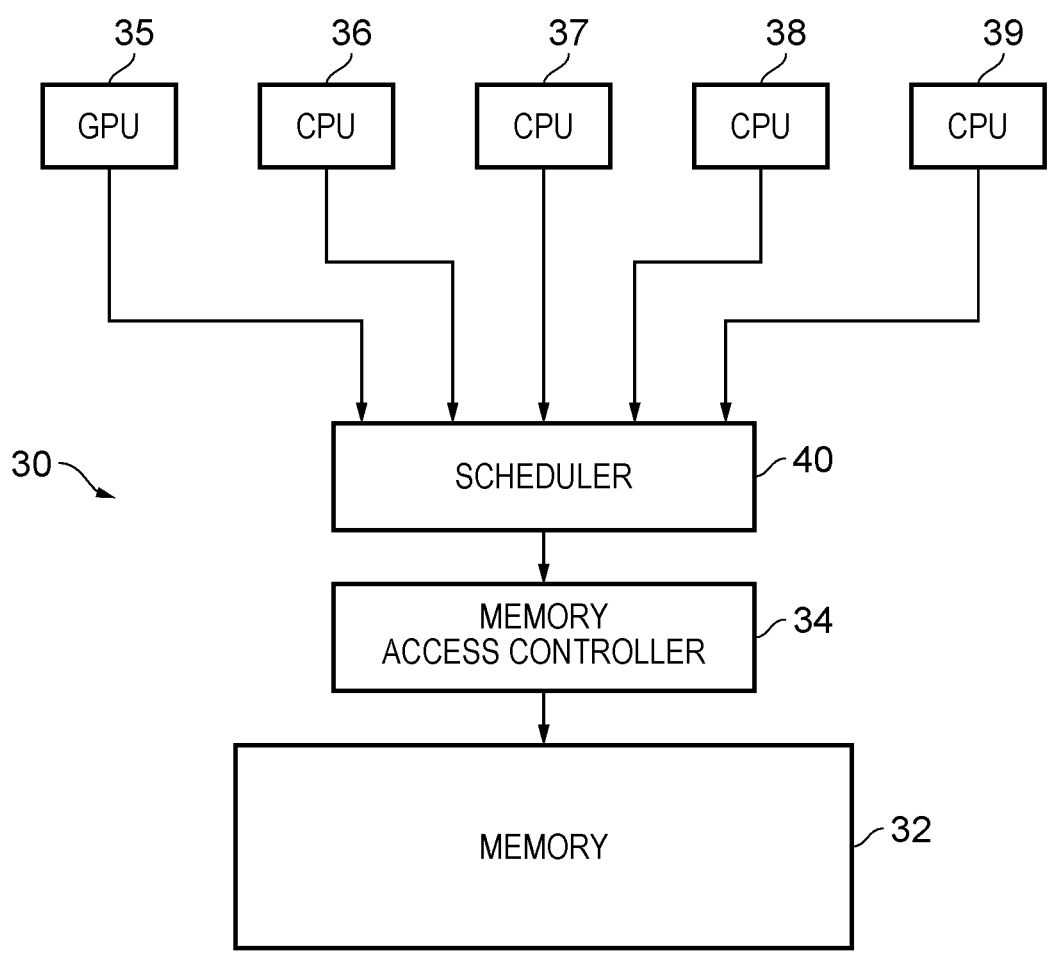
FIG. 2 schematically illustrates a system comprising multiple CPUs and a GPU which share access to a memory, access to this shared resource being controlled by a scheduler and a memory access controller in one example embodiment.

FIG. 2 schematically illustrates another example embodiment of the present techniques. The data processing system 30 comprises a shared memory 32, access to which is controlled by a memory access controller 34. Multiple data processing units, namely the GPU 35, and the CPUs 36, 37, 38, 39 each seek access to the shared memory 32 in that they issue memory access requests. These memory access requests are received by a scheduler 40, which determines a usage schedule on the basis of currently pending unscheduled usage requests and passes this to the memory access controller 34 which then allows the respective memory access requests to be implemented, in dependence on the determined memory usage schedule. Whereas in this example the CPUs 36-39 are general purpose data processing units, it will be recognised that the GPU 35 is a data processing unit which specialises in the kind of data processing which may be of benefit in the context of graphics processing, and this can impose particular memory access requirements, for example in terms of both (minimum) bandwidth and (maximum) response latency, such that for example graphics rendering which relies on the processing performed by the GPU 35 does not stall.

Figure 3:
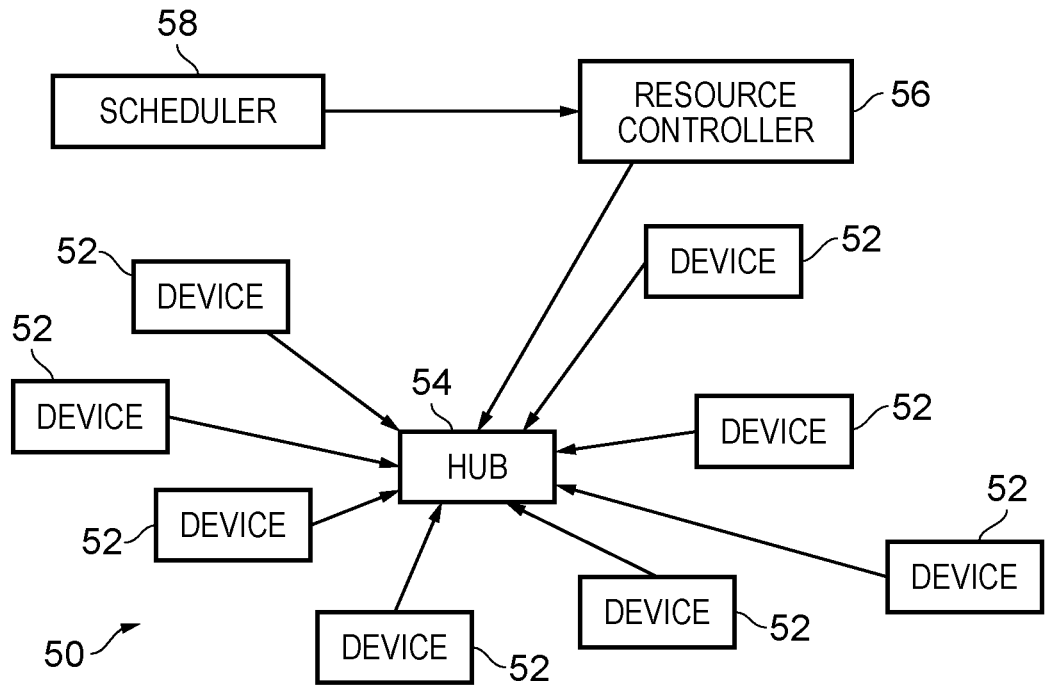
FIG. 3 schematically illustrates a system comprising multiple devices connected to a hub, wherein access to the hub is controlled by a resource controller the schedule of which is determined by a scheduler according to one example embodiment.

FIG. 3 schematically illustrates a further example embodiment of the present techniques. Here, the system 50 under consideration is a collection of small devices 52, each configured to communicate with a central hub 54. This system 50 may be considered to be an Internet-of-Things (IoT) network, where the respective devices 52 are each very simply configured stand-alone nodes. In the context of the present techniques this means therefore that the devices 52 may not easily be inspected to determine what shared resource requests they have, which context enhances the applicability of the present techniques, according to which individual resource users' queue statuses need not be inspected (i.e. it is not known beyond an individual scheduling round what further requests will be received from a given user). In the system 50, each device 52 makes use of the hub 54 in order to communicate aspects of the data processing which it has performed. For example, each device 52 may comprise a sensor and this communication may comprise conveying a reading from that sensor via the hub 54. The hub 54 may therefore be considered to be a shared resource and a resource controller 56 is provided to control which of the devices 52 may currently make use of the communication capability of the hub 54. A separate scheduler 58 is provided which schedules usage of the hub 54 between the multiple devices 52. The usage schedule is determined by the scheduler 58 (round by round) and the schedule is communicated to the resource controller 56 which then allows access to the hub 54 in accordance with that schedule.

Figure 4:
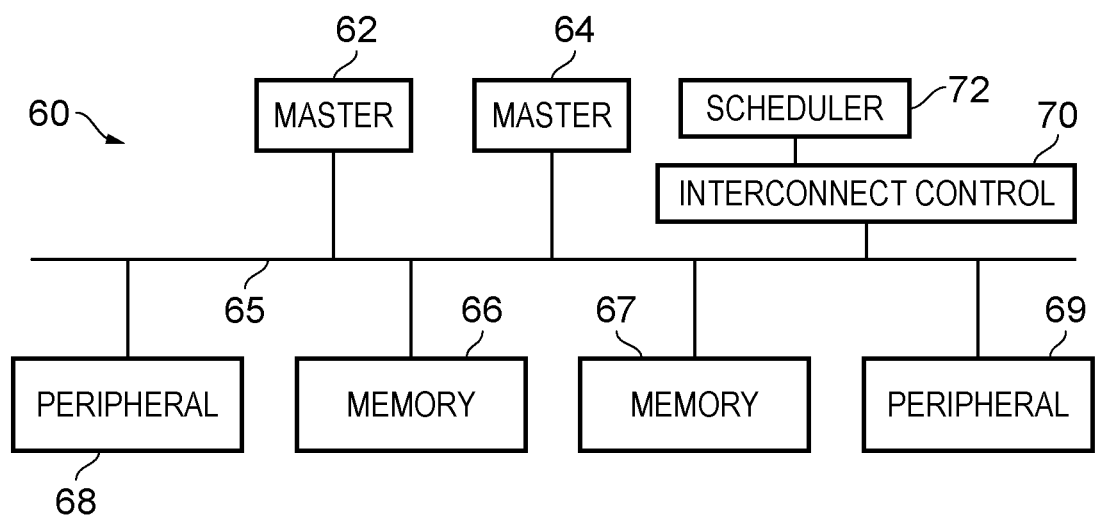
FIG. 4 schematically illustrates a data processing system comprising multiple masters, an interconnect, and multiple devices which those masters access, wherein interconnect usage is controlled by an interconnect control according to a schedule determined by a scheduler in one example embodiment.

FIG. 4 schematically illustrates a further example embodiment. Here, a data processing system 60 comprises two master devices 62, 64 which are connected to an interconnect 65. Via the interconnect 65 the master devices 62, 64 have access to shared memories 66, 67, as well as two other peripheral devices 68, 69. Control over the interconnect and its shared usage is administered by a dedicated interconnect control unit 70, which receives requests from the master devices 62, 64 to use the interconnect 65 to access the memories 66, 67 and the peripherals 68, 69 and allocates interconnect usage between them. The allocation of this interconnect usage is performed on the basis of the usage schedule which is determined by the scheduler 72, which operates in accordance with the present techniques to determine a usage schedule for the interconnect.

Before implementing a (ongoing) process of scheduling usage of a shared resource, this may be preceded by a pre-scheduling configuration procedure according to which a per-round usage allowance ("quantum") and a maximum request latency are determined for each resource user.

Example Implementation

In this example a set of masters each seek access to a shared resource in terms of data which the respective masters seeks to send to the shared resource.

Every registered master is assigned a configured Quantum, which is defined as the amount of data a master can send in a Round. A Round is defined as finished when all registered and active masters have been served at least their allocated Quantum.

Each Round has a Round Priority assigned, which starts from the highest available value. Every master, which gets service during a Round and within its Quantum limit, is assigned the Round Priority. Every time a master i is assigned more than its quantum during a Round k, it gets assigned a priority equal to $P_i = RoundPriority_k - PriorityDistance_i$ This is to ensure that every master achieves a minimum guaranteed data rate and also a maximum guaranteed latency.

The Quantum and Priority Distance assignments for each master enable the provision of both a minimum guaranteed bandwidth $B_i$ and a maximum guaranteed latency $L_i$ to each participating Master i, at every scheduling Round.

$$B_i = \frac{Q_i}{\sum_n Q_n} * TotalBandwidth$$

$$L_i = \frac{\sum_n Q_n}{TotalBandwidth} * PriorityDistance_i$$

Given a set of Masters $M_i \in M$, all serviced data within the Quantum will be served with no latency (0 rounds delay), while all data exceeding the Quantum can—at most—experience a delay which is the time needed to transmit all of the allocated Quantum in the current Round (−1, otherwise the Round would have finished) times the PriorityDistance$_i$—in the worst case where there have been PriorityDistance$_i$−1 rounds before the current one.

The maximum "in-quantum delay" (for data packets that fit within the allocated Quantum) can be computed as:

$$\Phi_i = \frac{3 * \sum_n Q_n - 2 * Q_i}{TotalBandwidth}$$

A pre-scheduling configuration procedure can be carried out to configure the quantum and priority distance for each master for given bandwidth and latency requirements by following the procedure below:

1. Set PriorityDistance$_i$=1 for all masters
2. Per each master, compute $\Sigma_n Q_n = L_i * TotalBandwidth$ 3. Select the final value for $\Sigma_n Q_n$ as the Lowest Common Multiple (LCM) of all values computed at point 2
4. Compute the per-master priority distance as $$PriorityDistance_i = L_i * \frac{TotalBandwidth}{\sum_n Q_n}$$

5. Compute $Q_i$ as $$Q_i = \sum_n Q_n * \frac{B_i}{TotalBandwidth}$$

Following this pre-scheduling configuration procedure an assessment (either manual or automated) can be carried out to determine if the quanta and priority distances thus determined are acceptable. This can be according to one or more criterion defined, for example defined with respect to the performance requirements of each master. This can also (instead or in addition) be according to one or more implementation-defined criterion, for example a practical limit on the size of priority distances which can be implemented. Further, the pre-scheduling configuration procedure can then be iterative in that if at least one criteria is not satisfied, either or both of the defined bandwidth and latency requirements for at least one master device is varied and the pre-scheduling configuration procedure is re-run.

Figure 5:
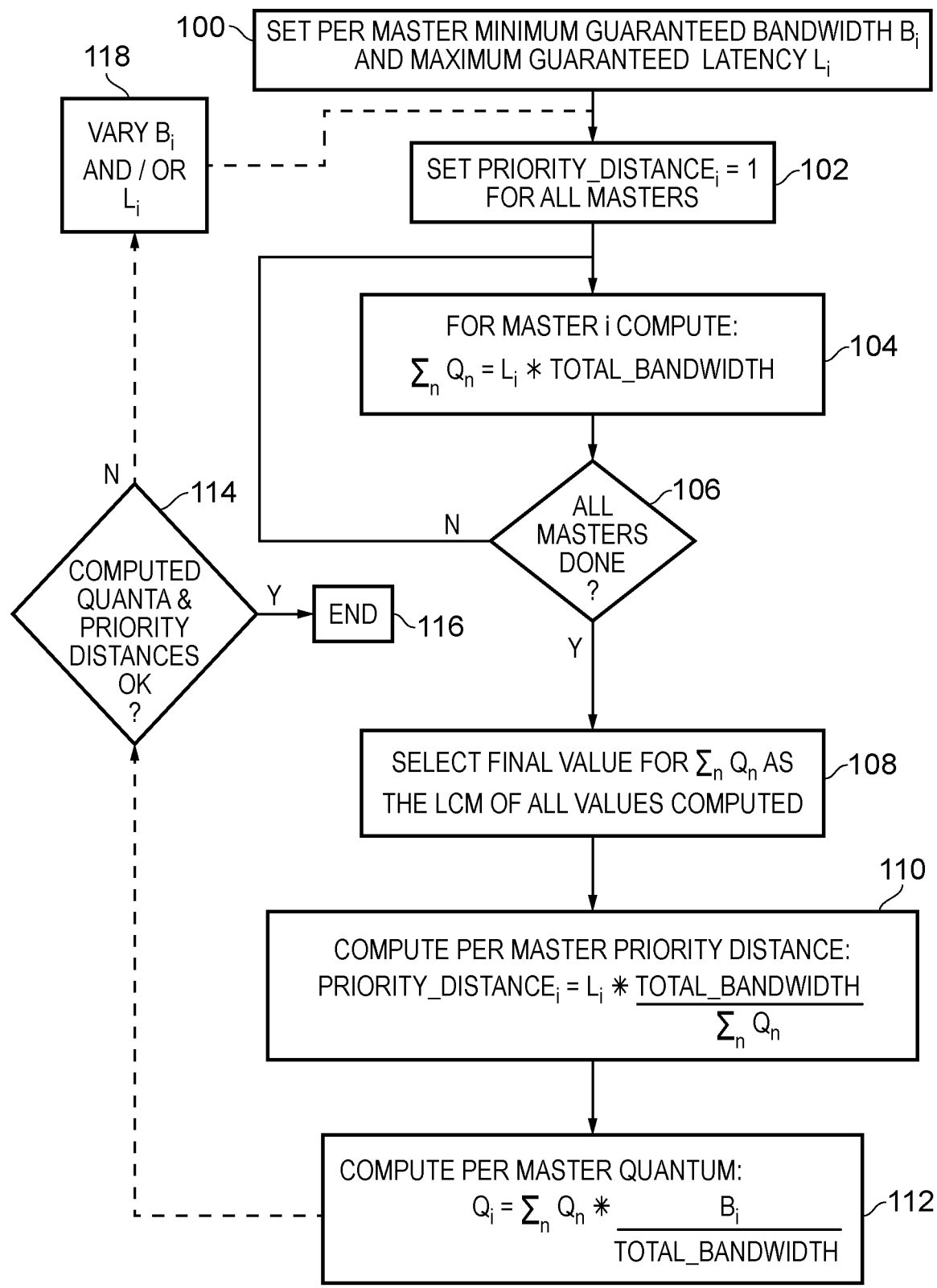
FIG. 5 is a flow diagram showing a sequence of steps according to which a per master priority distance and a per master quantum to be used when determining a schedule for access by the masters to a shared resource are determined according to a method of one example embodiment.

FIG. 5 shows a sequence of steps which are carried out in a method embodiment. This process begins at step 100 where for each master (resource user) a minimum guarantee bandwidth $B_i$ and a maximum guaranteed latency $L_i$ are defined in accordance with quality-of-service (QoS) thresholds which are hoped to be achieved for each master. Then at step 102 a priority distance for each master is set to 1, corresponding to a default position according to which, when a master has more unscheduled usage requests then can be accommodated by its per-round usage allowance, the remainder of the unscheduled usage requests would be scheduled for the next round following the current round (where the usage schedule for the resource is determined in a sequence of rounds). Then at step 104, for each master, a candidate sum of the per-round usage allowances for the multiple masters is computed. The flow then loops at this step via step 106 until this has been computed for each master. Once this is done then at step 108 a final value for the sum of the per-round usage allowances for the multiple masters is selected as the lowest common multiple (LCM) of all the candidate sums determined at step 104. Next at step 110 a priority distance is calculated for each master, making use of this selected sum of the per-round usage allowances. Finally, at step 112 a per-round usage allowance (quantum) for each master is also determined. Note that although the computation of the per master priority distance (at step 110) and the computation of the per master quantum (at step 112) are illustrated at the example of FIG. 5 as being sequential steps, there is no need according to the present techniques for these steps to occur in this particular order and indeed they could be inverted in order or equally be computed in parallel with one another.

The pre-scheduling configuration procedure has then determined quanta and priority distances for each master. It may however, typically be necessary to determine whether these quanta and priority distances are appropriate according to some predetermined criteria for the system and the dashed line leading from step 112 to step 114 illustrates the (optional) further process by which satisfaction of one or more selection criterion may be carried out. Thus, at step 114 in the example of FIG. 5, it is determined whether the computed quanta and priority distances are acceptable. For example, each master may have its own quality-of-service requirements which correspond to a certain access bandwidth which it requires and its own maximum (tolerable) request latency. When the computed quanta and priority distances meet the selection criteria then the process ends at step 116. However, if at least one of the criteria are not met then the flow may proceed to step 118 where at least one of the minimum guaranteed bandwidth $B_i$ and/or the maximum guaranteed latency $L_i$ are varied and the process begins again at step 102. In this manner, the pre-scheduling configuration procedure can iterate towards acceptable per-master priority distances and quanta. Alternatively where the requirements of each master are such that in combination they present a mutually incompatible configuration (e.g. because the shared resource simply cannot support the combined bandwidth requirements) then it may not be possible to find a configuration which is feasible, i.e. according to which priority distances and quanta can be found. The pre-scheduling configuration procedure may therefore (for example as part of the assessment step 114) have a further check to determine if the iterative process is not converging and to indicate this to a user and/or to abort the configuration seeking process itself (i.e. indicating to the user that the demanded set of per master minimum guaranteed bandwidths and maximum guaranteed latencies cannot be supported.

Figure 6:
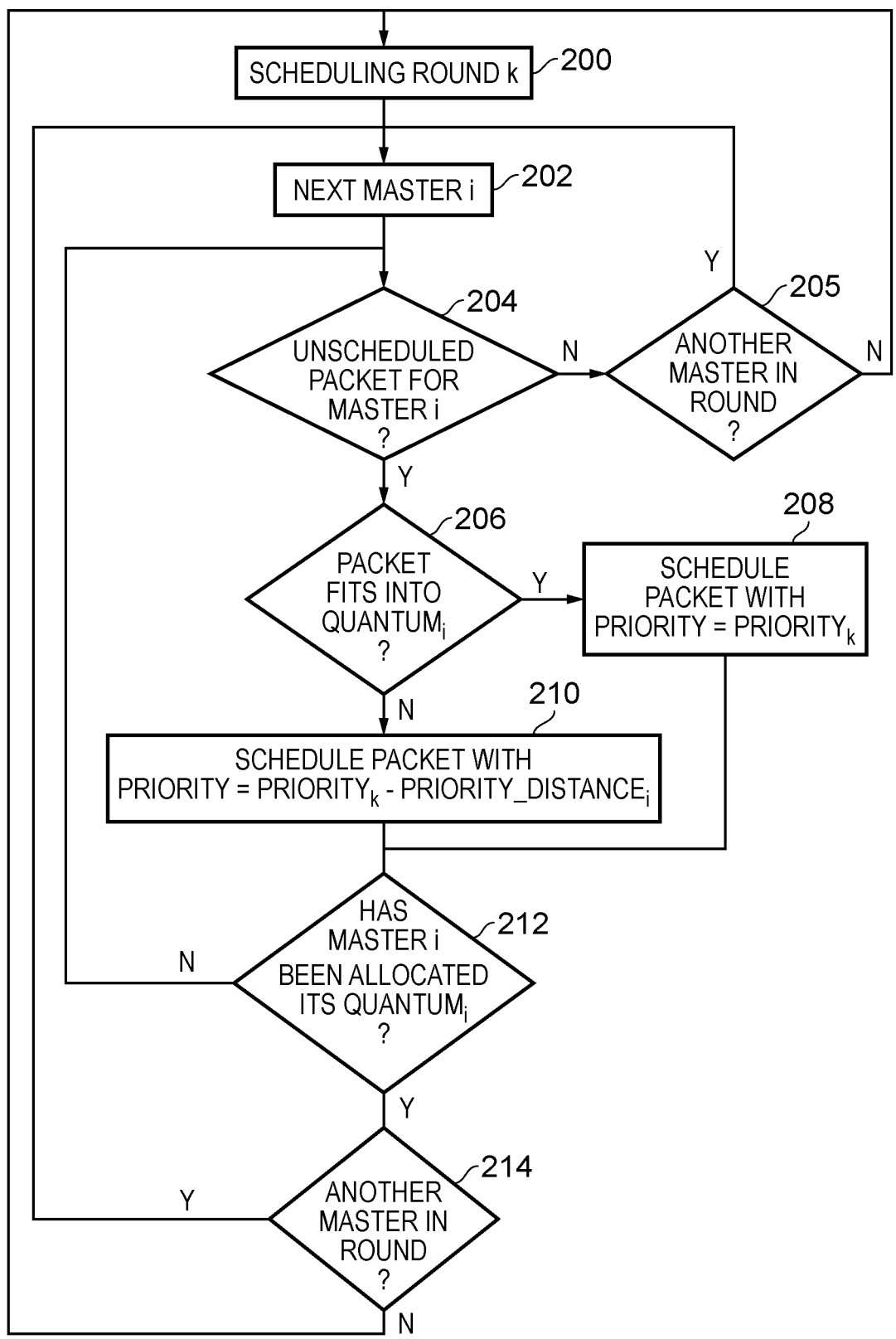
FIG. 6 is a flow diagram showing a sequence of steps which are taken when determining a schedule for usage of a resource shared between multiple resource users according to the method of one example embodiment.

FIG. 6 is a flow diagram which shows an implementation of the present techniques in one example embodiment for scheduling usage of a shared resource. The flow can be considered to begin at step 200 in scheduling round k. For each round, the scheduling is determined for each master and thus at step 202 the next master i is considered. At step 204 it is determined if there is at least one unscheduled packet (i.e. resource usage request) for this master. If there is not then the flow proceeds to step 205, where it is determined if there is another master to scheduled in this round. Whilst there is the flow will return to step 202, whilst if this is not true then the round is complete and the flow returns to step 200 for processing of the next round to begin. When at step 204 there is at least one unscheduled packet for the current master then the flow proceeds to step 206 where it is determined if this request fits into the defined quantum (per-round usage allowance) for this master. If it does then the flow proceeds to step 208, with the packet is scheduled where a priority corresponding to the current round k. Alternatively if the packet will not fit into the quantum then at step 210 it is scheduled with a priority corresponding to the priority of the current round less the defined priority distance for this master. It should be understood therefore that according to the round and priority definitions used in the example of FIG. 6 the enumeration of the rounds is such that sequential rounds decrease. For example if the current round is enumerated 10 then the priority associated with that round will also be 10 and when a master has a defined priority distance of 4 then when a packet cannot be scheduled in the current round (because it exceeds the quantum) then the associated priority to implement this is 10−4=6, i.e. that this packet will be scheduled for round 6 which will follow in four rounds' time. Following the scheduling of this packet (either for the current scheduling round or for a later scheduling round) the flow then proceeds to step 12, where it is determined if the current master i under consideration has been allocated its quantum, i.e. it has had packets scheduled for this round which are equal to its own usage allowance. When this is not the case the flow returns to step 204 and scheduling of a further packet for this master (if such exists) will be attempted. Otherwise from step 212, when this master has been allocated its full quantum, the flow proceeds to step 214 where it is determined if there is another master for which resource scheduling should be performed in this round. When there is the flow returns to step 202 for the next master to be processed, and when all masters in the round have been processed the flow returns to step 200 for the next scheduling round to begin.

In brief overall summary, methods of scheduling usage of a resource between multiple resource users and corresponding schedulers are disclosed. The scheduling is performed by initially allocating a per-round usage allowance to each resource user of the multiple resource users and then determining a usage schedule for the resource in a sequence of rounds. At each round the determining comprises, for each resource user, when there are unscheduled usage requests for the resource user, scheduling a portion of the unscheduled usage requests which does not exceed the per-round usage allowance for the resource user, wherein the portion is scheduled for resource usage in association with the current round. Further, at each round, when there exists a remainder of the unscheduled usage requests which exceeds the per-round usage allowance for the resource user, the remainder is scheduled in association with a later round, wherein a number of rounds offset from the current round to the later round is calculated in dependence on a specified maximum request latency for the resource user. Minimum bandwidth and maximum latency requirements for each user are thus supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. A method of scheduling usage of a resource between multiple resource users comprising:
    allocating a per-round usage allowance to each resource user of the multiple resource users; and
    determining a usage schedule for the resource in a sequence of rounds, wherein in a current round the determining comprises, for each resource user:
        when there are unscheduled usage requests for the resource user, scheduling a portion of the unscheduled usage requests which does not exceed the per-round usage allowance for the resource user, wherein the portion is scheduled for resource usage in association with the current round; and
        when there exists a remainder of the unscheduled usage requests which exceeds the per-round usage allowance for the resource user, scheduling the remainder in association with a later round, wherein a number of rounds offset from the current round to the later round is calculated in dependence on a specified maximum request latency for the resource user.

2. The method as claimed in claim 1, wherein the number of rounds offset is calculated as the specified maximum request latency for the resource user multiplied by a per-round throughput.

3. The method as claimed in claim 2, wherein the per-round throughput is a total bandwidth for the resource divided by a sum of the per-round usage allowances for the multiple resource users.

4. The method as claimed in claim 1, wherein for each resource user of the multiple resource users the per-round usage allowance is calculated as a bandwidth share for the resource user multiplied by a sum of the per-round usage allowances for the multiple resource users.

5. The method as claimed in claim 4, wherein the bandwidth share for the resource user is calculated as a specified minimum bandwidth for the resource user divided by a total bandwidth for the resource.

6. The method as claimed in claim 1, wherein scheduling the portion for resource usage in association with the current round comprises associating with the portion a priority associated with the current round.

7. The method as claimed in claim 1, wherein scheduling the remainder in association with the later round comprises associating with the remainder a priority associated with the later round.

8. The method as claimed in claim 7, wherein the priority associated with the later round is calculated as a priority associated with the current round less a predetermined priority distance for the resource user, wherein the priority distance is selected to represent the specified maximum request latency for the resource user.

9. The method as claimed in claim 1, further comprising a pre-scheduling configuration procedure comprising:
    setting a candidate maximum request latency for each resource user;
    setting a candidate minimum bandwidth for each resource user;
    determining a candidate number of rounds offset from the current round to the later round in dependence on the candidate maximum request latency for each resource user; and
    determining a candidate per-round usage allowance for each resource user in dependence on the candidate minimum bandwidth for each resource user.

10. The method as claimed in claim 9, further comprising an evaluation procedure comprising:
    determining whether the candidate number of rounds offset for each resource user satisfies at least one number of rounds selection criterion;
    determining whether the candidate per-round usage allowance for each resource user satisfies at least one usage allowance selection criterion; and
    when at least one of the number of rounds selection criterion and the usage allowance selection criterion is not satisfied, causing the pre-scheduling configuration procedure to be reiterated with at least one of:
        a modified candidate maximum request latency for each resource user; and
        a modified candidate minimum bandwidth for each resource user, with respect to prior iterations of the pre-scheduling configuration procedure.

11. The method as claimed in claim 9, further comprising:
    for each resource user, computing a candidate sum of the per-round usage allowances for the multiple resource users as a product of the candidate maximum request latency for the resource user and the total bandwidth for the resource; and determining a lowest common multiple of the candidate sums computed.

12. The method as claimed in claim 11, further comprising:
for each resource user, determining the candidate number of rounds offset as a product of the candidate maximum request latency for the resource user and the total bandwidth for the resource, divided by the lowest common multiple of the candidate sums computed.

13. The method as claimed in claim 11, further comprising:
for each resource user, determining the candidate per-round usage allowance as a product of the candidate minimum bandwidth for the resource user and the lowest common multiple of the candidate sums computed, divided by the total bandwidth for the resource.

14. The method as claimed in claim 9, wherein prior to a first iteration of the pre-scheduling configuration procedure the candidate number of rounds offset for each resource user is set to one.

15. The method as claimed in claim 1, further comprising transmitting the usage schedule for the resource to a resource controller arranged to implement the usage schedule for the resource.

16. The method as claimed in claim 1, further comprising controlling usage of the resource between the multiple resource users by implementing the usage schedule.

17. A scheduler for scheduling usage of a resource between multiple resource users comprising:
allocation circuitry to allocate a per-round usage allowance to each resource user of the multiple resource users; and
usage schedule determination circuitry to determine a usage schedule for the resource in a sequence of rounds, wherein the usage schedule determination circuitry is arranged, in a current round and for each resource user, to:
when there are unscheduled usage requests for the resource user, schedule a portion of the unscheduled usage requests which does not exceed the per-round usage allowance for the resource user, wherein the portion is scheduled for resource usage in association with the current round; and
when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

18. A scheduler for scheduling usage of a resource between multiple resource users comprising:
means for allocating a per-round usage allowance to each resource user of the multiple resource users; and
means for determining a usage schedule for the resource in a sequence of rounds, wherein the means for determining is arranged, in a current round and for each resource user, to:
when there are unscheduled usage requests for the resource user, schedule a portion of the unscheduled usage requests which does not exceed the per-round usage allowance for the resource user, wherein the portion is scheduled for resource usage in association with the current round; and
when there exists a remainder of the unscheduled usage requests which exceeds the per-round usage allowance for the resource user, schedule the remainder in association with a later round, wherein a number of rounds offset from the current round to the later round is calculated in dependence on a specified maximum request latency for the resource user.

* * * * *